United States Patent [19]

Dezael et al.

[11] 4,029,745

[45] June 14, 1977

[54] PROCESS FOR REDUCING MOLTEN AMMONIUM SULFATES CONTAINING METALLIC IMPURITIES TO AMMONIA AND SULFUR DIOXIDE

[75] Inventors: Claude Dezael, Maisons Laffitte; Philippe Renault, Noisy le Roi; André Deschamps, Chatou, all of France

[73] Assignee: Institut Francais du Petrole des Carburants et Lubricants et Enterprise de Recherches et d'Activities Petroliers Elf, Rueil-Malmaison, France

[22] Filed: July 21, 1975

[21] Appl. No.: 597,532

[30] Foreign Application Priority Data

Aug. 1, 1974 France .............................. 74.27060

[52] U.S. Cl. .............................. 423/356; 423/541 A
[51] Int. Cl.² ...................... C01B 17/50; C01C 1/02
[58] Field of Search .............. 423/356, 541, 541 A, 423/545, 659 A

[56] References Cited

UNITED STATES PATENTS

| 3,810,968 | 5/1974 | Renault et al. ..................... 423/545 |
| 3,833,715 | 9/1974 | Deschamps et al. ............. 423/356 |
| 3,884,644 | 5/1975 | Bonnema et al. ................. 423/545 |

FOREIGN PATENTS OR APPLICATIONS 255,876 10/1927 United Kingdom ............... 423/545

OTHER PUBLICATIONS

Beck et al., APC Application No. 292,742, Published 13 July 1943.
Beck et al., APC Application No. 393,258, Published 13 July 1943.

*Primary Examiner*—O. R. Vertiz
*Assistant Examiner*—Gary P. Straub
*Attorney, Agent, or Firm*—Millen & White

[57] ABSTRACT

Molten ammonium sulfates containing iron sulfate as an impurity may be reduced with sulfur or a sulfur compound over long periods provided a fraction of these impure ammonium sulfates is withdrawn, treated for iron removal and fed back to the reduction zone.

7 Claims, No Drawings

PROCESS FOR REDUCING MOLTEN AMMONIUM SULFATES CONTAINING METALLIC IMPURITIES TO AMMONIA AND SULFUR DIOXIDE

Various industrial plants discharge waste liquors containing ammonium sulfites or ammonium sulfates or mixtures thereof. Substantial amounts of these effluents result, for example, from the treatment of ores by the wet process technique, for example nickel hydrometallurgy, or from industrial plants producing major chemical intermediates, such as caprolactam. They may also result from the washing of combustion waste-gas by means of ammonia brine.

These industrial liquors contain, in addition to these ammonium salts, more or less important amounts of metals resulting from the corrosion of conventional or stainless steels with these solutions, for example iron, nickel, vanadium, cobalt, chromium, manganese or zinc, and/or metals obtained by hydrometallurgical treatments, such as copper, nickel or aluminum.

Metal salts are also present in solutions resulting from stack-gas purification; these salts result from the dissolution of fines contained in these stack-gases.

These solutions may also contain cations, present in waters used for preparing the solutions, for example sodium, calcium and magnesium.

It is well known to reduce ammonium sulfates at temperatures from 150° to 450° C. For example, French Patent Application No. 7209 117 of Mar. 15, 1972, discloses a process for reducing ammonium sulfates to sulfur dioxide. Heavy metal sulfates and calcium, magnesium, sodium and potassium sulfates are not destroyed in the reactor where the sulfates are reduced; they accumulate and form a solution and/or suspension in the ammonium sulfate bath.

Some of these sulfates are not very harmful. For example, as hereinafter stated, the accumulation of large amounts of sodium sulfate is acceptable. On the contrary, it has been found that iron compounds, when accumulated in the ammonium sulfate bath, have a really detrimental effect at a certain level of concentration: they result in a thickening of the bath, which produces a substantial pressure drop; the ammonium sulfate conversion rate sharply decreases when the iron concentration of the bath, expressed by weight of Fe $SO_4$ iron sulfate, is higher than 15%.

This invention concerns a process in which ammonium sulfate containing iron sulfate as an impurity is progressively fed to a reaction zone at 150°–450° C, where this impure ammonium sulfate is reacted, in the molten state, with a sulfur-containing reducing agent and thus converted to gaseous reaction products, and said gaseous reaction products are withdrawn, and wherein the iron sulfate content of said impure ammonium sulfate within the reaction zone is maintained between 1 and 15% by weight by (a) withdrawing a fraction of said impure ammonium sulfate, (b) treating the withdrawn fraction with water and ammonia, thereby precipitating iron, (c) separating said iron precipitate from the ammonium sulfate fraction whose iron content has been decreased, and (d) recycling the ammonium sulfate fraction obtained in step (c) to the reaction zone.

The exact form in which iron is present is not known with certainty, but it supposed to be essentially iron sulfate.

The sulfur-containing reducing agent is preferably molecular sulfur, hydrogen sulfide and/or ammonium thiosulfate (including ammonium polythionates). For one gram-molecule of iron sulfate, there is preferably used about 0.5 gram-atom of sulfur, 0.5 gram-atom of ammonium thiosulfate or ⅓ gram-molecule of hydrogen sulfide.

The present invention thus concerns a technique whereby it is possible to avoid the above stated disadvantages and to recover in a concentrated form, foreign elements contained in these ammonium sulfate mixtures, some of which are valuable elements.

The fraction discharged from the reactor where the ammonium sulfate reduction takes place usually comprises a mixture of ammonium sulfate, ammonium bisulfate, iron sulfate and, when present, other metal sulfates, particularly various heavy metal sulfates, and/or sodium, calcium, magnesium and/or potassium sulfates.

Depending on the temperature prevailing in the ammonium sulfate reduction zone, i.e. usually 150°–450° C, the composition of the ammonium salts is usually such that the molar ratio of $SO_3$ to $NH_3$ in the mixture ranges from 0.55 to 0.95, and is preferably about 0.75.

The sodium salts may, without disadvantage accumulate in the bath up to concentrations of about 50% by weight, when expressed as $Na_2SO_4$, the following reaction taking place:

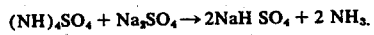

$(NH_4)_2SO_4 + Na_2SO_4 \rightarrow 2NaH\,SO_4 + 2\,NH_3.$

The bath remains fluid since, within the above temperature range, sodium bisulfate is in molten state. On the contrary, calcium salts are insoluble and, in this particular case, it is desirable to avoid a concentration of more than 10% b.w., expressed as $CaSO_4$.

The invention comprises treating a fraction withdrawn from the reduction zone with ammonia and water, to form a metal-containing precipitate which is separated from the remaining solution of ammonium sulfates, said solution being recycled to the sulfate reduction zone.

When the molten ammonium sulfates contain such cations as calcium, sodium or magnesium, the invention may be modified to previously treat the fraction withdrawn from the reduction zone with water, while decreasing the temperature, so as to precipitate slightly soluble salts such as calcium sulfate and then evaporate a portion of said water to obtain the settling or crystallizaton of other more soluble salts.

When the bath contains calcium and sodium salts, the latter may be easily separated by cooling of their solution in water. An easy way to proceed comprises pouring the fraction discharged from the ammonium sulfate bath into cold water. The amount of water to be used is not significant when working with highly insoluble calcium sulfates. They yield a precipitate which may be separated from the rest of the solution, for example, by filtration or centrifugation. When the amount of water is too large to obtain the settling of sodium, magnesium and/or potassium sulfates, it is necessary to evaporate a large portion of water from the remaining solution, preferably at moderate temperature, so that settling of these salts may occur. They are separated from the solution, for example by decantation or filtration; a major amount thereof may thus be removed.

The rest of the solution mainly comprises ammonium sulfates and sulfates of other metals accumulated in the sulfate reduction bath.

Water and ammonia are then added in sufficient amount to raise the pH of the resulting mixture above 7, a precipitate being thus formed. The mixture is usually maintained at a temperature close to its boiling point, under atmospheric or superatmospheric pressure. Operating temperatures are in the range, for example, from 50° to 200° C. When performing this treatment, after removal fo such salts as calcium and sodium sulfates, it is desirable to sufficiently heat the solution in order to obtain the better conditions for settling.

This is unnecessary when the latter treatment is applied to the fracton withdrawn from the reduction zone.

Water and ammonia are usually employed in proportions corresponding, for example, to 1–10 moles of ammonia per liter of the resulting mixture, preferably 1–3 moles of ammonia per liter.

Nevertheless, depending on the nature of the metals to be removed, it may be advantageous in some cases to proceed in the presence of hydrogen sulfide; otherwise ammonium sulfide may be added to ensure complete precipitation. This is the case when the metals are, for example, zinc, manganese, nickel or cobalt.

The precipitate, as formed, comprises metal hydroxides and sometimes metal sulfides; it is separated from the medium, for example, by decantation, filtration or centrifugation. It is usefully washed with water which may be reused to constitute the ammonia solutions. It may be further dried or calcined.

The rest of the solution is essentially an aqueous solution of ammonium sulfate and possibly ammonium sulfide; it may be fed back to the reactor where the sulfates are reduced. There is thus no inconvenience in using hydrogen sulfide or ammonium sulfide in excess during settling, since hydrogen sulfide will act as a reducing agent and ammonia will vaporize. Whenever some sodium sulfate is still present, due to an insufficient evaporation or cooling of the solution during the removal of said sulfate, the amount thereof is low and not harmful.

The following non-limitative examples are given for illustration purposes.

EXAMPLE 1

According to this example, a sulfate reduction plant is fed with relatively pure reactants.

A solution of ammonium sulfites and sulfates is discharged from a plant designed to purify sulfur dioxide containing waste-gas by means of an aqueous ammonia solution.

A fraction of said sulfites is vaporized by heating at 100°–140° C, and the remaining liquor, whose composition is stated hereinafter, is supplied to an ammonium sulfate bath maintained at 350° C whose weight is 1,000 kg.

The liquor fed to the bath provides, per hour:
0.4 kmole of $(NH_4)_2SO_3$
1.3 kmole of $HNH_4SO_3$
1 kmole of $(NH_4)_2SO_4$ and
3 kmoles of water.
0.5 kmole per hour of $(NH_4)_2S_2O_3$ is added thereto.

An effluent gas comprising 24.7% $SO_2$, 34% $NH_3$ and 41.3% $H_2O$ by volume is discharged from the bath.

It is observed that the sulfur introduced as sulfate is completely converted. This conversion remains unchanged after 50, 100 and 150 hours of run.

EXAMPLE 2

The waste-gas to be purified contains iron in the form of dust. The ammonium sulfate bath is fed with a liquor of the same composition as in example 1, but with in addition 0.01 kmole of Fe $SO_4$ per hour.

In the course of time, although the feeding of the bath remains unchanged, the $SO_2$ content of the effluent gas decreases, i.e. the amount of $SO_2$ in the effluent gas becomes lower than the sulfur content in the form of sulfate of the feed charge. Simultaneously the Fe $SO_4$ content of the bath increases. The following table gives the results obtained.

| t (hours) | $FeSO_4$ (kg) in the bath | Conversion of the sulfates to $SO_2$ | Effluent gas % $SO_2$ by vol. | % $NH_3$ by vol. |
|---|---|---|---|---|
| 65 | 100 | 0.97 | 24.35 | 33.8 |
| 98 | 150 | 0.94 | 24.25 | 32.8 |
| 130 | 200 | 0.87 | 24.1 | 31.8 |
| 165 | 250 | 0.60 | 22.0 | 31.0 |

A sharp decrease of the $SO_2$ conversion and a substantial increase of viscosity take place after 165 hours. This shows that about 5–15% by weight of $FeSO_4$ in the bath is tolerable. Beyond 15%, the conversion sharply decreases.

EXAMPLE 3

The plant of example 2 was operated for 65 hours, so that 100 kg of $FeSO_4$ accumulated in the ammonium sulfate bath. 20 kg per hour of bath material were withdrawn and admixed with 60 liters of ammonia solution at a concentration of 1.5 N, and the temperature within the closed vessel was maintained at about 105° C for 10 minutes. The vessel was subjected to cooling and decantation; the overflowing liquor was discharged, then the precipitate was filtered and washed with water. Wash water was re-used for preparing the ammonia solution. The filtrate and overflowing liquor were fed back to the sulfate reduction reactor. The sulfur conversion rate remained unchanged (95%) for 250 hours and the experiment was then discontinued.

EXAMPLE 4

Example 2 is repeated, except that the liquor initially fed to the ammonium sulfate bath only contains 0.005 kmole of $FeSO_4$ per hour, plus 0.003 kmole/hour of vanadium sulfate and 0.002 kmole/hour of nickel sulfate.

When 100 kg of iron, vanadium and nickel sulfates have accumulated in the bath, 20 kg per hour of mixture were treated with 30 liters of an ammonium solution containing 1.5 moles of ammonia per liter, to which 200 cc of aqueous $(NH_4)_2S$ solution (8 moles per liter) were added. The temperature was 100° C and the pressure slightly super atmospheric (1.2 kg/cm² absolute).

After a contact time of about 10 minutes and cooling to about 60° C followed with decantation, the supernatent liquor is withdrawn and the precipitate separated by filtration: the supernatant liquor and the filtrate are fed back to the ammonium sulfate reduction zone. The sulfate conversion rate (94%) remains unchanged.

EXAMPLE 5

Stack gas containing $SO_2$, $SO_3$ and iron dust were washed with ammonia solution prepared with natural water containing 15 mg/l of $Na^+$ and 90 ml/l of $Ca^{++}$.

The resulting sulfite solution is regenerated by heating and finally fed to a reactor maintained at about 400° C, temperature at which the ammonium sulfates are reduced with hydrogen sulfide to $SO_2$, $NH_3$ and $H_2O$.

0.200 kg/h of $Na_2SO_4$, 0.136 kg/h of $CaSO_4$ and iron sulfate have accumulated. The reactor is operated until the bath (total weight: 500 kg) contains 50 kg of $CaSO_4$, 73.5 kg of $Na_2SO_4$ and 15 kg of iron sulfate. 107 kg of mixture is then withdrawn and poured into water.

The insoluble salts (calcium sulfate) separate and are filtered off and discharged. The remaining solution is partially evaporated until sodium sulfate crystals ($Na_2SO_4$, 10 $H_2O$) appear.

After filtration, the remaining solution is treated with an ammonia liquor, as stated in examples 1 and 2, and thereby made free from iron; it is then recycled to the sulfate reduction zone.

The process can be performed over more than 200 hours without decrease of the sulfate conversion rate.

We claim:

1. In a process for reducing ammonium sulfate containing at least iron sulfate as an impurity, wherein said impure ammonium sulfate is progressively introduced into a reaction zone at 150°–450° C, is reacted in the molten state with molecular sulfur, hydrogen sulfide and/or ammonium thiosulfate to form a sulfur-dioxide containing gas, and the so-formed gas is discharged, the improvement comprising maintaining the iron sulfate content of the impure ammonium sulfate in the reaction zone in the range of 1 to 15% by weight by (a) withdrawing a fraction of said impure ammonium sulfate from said bath at a sufficient rate to maintain the 1–15% by weight concentration of iron sulfate in the reaction zone, (b) treating the withdrawn fraction with water and ammonia so as to precipitate iron compounds, (c) separating the iron compound precipitate from the remaining ammonium sulfate fraction, of low iron content, and (d) feeding back the ammonium sulfate fraction obtained from step (c) to the reaction zone.

2. A process according to claim 1, wherein the impure ammonium sulfate also contains calcium sulfate and the fraction withdrawn from the reaction zone is admixed with water and cooled so as to settle calcium sulfate, the settled calcium sulfate is separated from the solution of ammonium sulfate and then the resultant separated solution is subjected to said step (b).

3. A process according to claim 1, wherein the fraction of molten ammonium sulfate withdrawn from the reaction zone is treated with (a) ammonia and (b) hydrogen sulfide or ammonium sulfide.

4. A process according to claim 1, wherein said impure ammonium sulfate also contains nickel, vanadium, cobalt, chromium, manganese, zinc, copper and/or aluminum sulfate.

5. A process according to claim 1, wherein ammonia is used in a sufficient amount to raise the pH above 7.

6. A process according to claim 1, wherein the treatment with ammonia is carried out at a temperature from 50° to 200° C under atmospheric or superatmospheric pressure.

7. A process according to claim 1, wherein the amount of mixture withdrawn from the molten ammonium sulfate reaction zone is such that the concentration of calcium salts remains lower than 10% by weight and the concentration of sodium salts remains lower than 50% by weight.

* * * * *

UNITED STATES PATENT AND TRADEMARK OFFICE
CERTIFICATE OF CORRECTION

PATENT NO. : 4,029,745
DATED : June 14, 1977
INVENTOR(S) : CLAUDE DEZAEL ET AL.

It is certified that error appears in the above-identified patent and that said Letters Patent are hereby corrected as shown below:

[73]   Assignee:   should read  - - - Institut Francais du Petrole - - - -.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*